United States Patent
Küsel

(10) Patent No.: US 7,624,857 B2
(45) Date of Patent: Dec. 1, 2009

(54) DEVICE FOR MONITORING A CONVEYOR

(75) Inventor: Bernd Küsel, Hamburg (DE)

(73) Assignee: Phoenix Conveyor Belt Systems GmbH, Bad Blankenburg (DE)

(*) Notice: Subject to any disclaimer, the term of this patent is extended or adjusted under 35 U.S.C. 154(b) by 699 days.

(21) Appl. No.: 10/579,585

(22) PCT Filed: Nov. 23, 2005

(86) PCT No.: PCT/DE2005/002094

§ 371 (c)(1),
(2), (4) Date: May 17, 2006

(87) PCT Pub. No.: WO2007/000123

PCT Pub. Date: Jan. 4, 2007

(65) Prior Publication Data

US 2009/0120768 A1 May 14, 2009

(30) Foreign Application Priority Data

Jun. 25, 2005 (DE) .................. 10 2005 029 637

(51) Int. Cl.
*B65G 43/02* (2006.01)
*B65G 43/06* (2006.01)
(52) U.S. Cl. ................. 198/502.4; 198/810.02
(58) Field of Classification Search ............... 198/802.1, 198/502.4, 810.01, 810.02
See application file for complete search history.

(56) References Cited

U.S. PATENT DOCUMENTS 6,032,787 A * 3/2000 Kellis .................... 198/810.02
6,781,515 B2 * 8/2004 Kuzik et al. ............... 340/676
6,831,566 B1 * 12/2004 Kusel ....................... 340/676

FOREIGN PATENT DOCUMENTS

DE          3611125 A1 * 10/1987  ............... 198/502.1

(Continued)

*Primary Examiner*—Mark A Deuble
(74) *Attorney, Agent, or Firm*—Collard & Roe, P.C.

(57) ABSTRACT

The invention relates to a device for monitoring a conveyor (1), comprising:
- a conveyor belt (2) made of elastomer material, having a carrying side (3) for the goods to be conveyed, and a running side (4), whereby the conveyor belt has, in particular, an embedded strength support;
- an optoelectronic system (5) that optically detects the carrying side (3) and/or the running side (4), particularly the carrying side, in that it recognizes damage during operation, and if a critical state of the conveyor belt is reached, triggers an acoustical and/or optical alarm (11) and/or, in particular, brings about an automatic shut-down of the system;
- a process computer (6), which is coupled with the optoelectronic system (5), for the purpose of evaluating all of the data, whereby the process computer is connected with the alarm (11) and/or a drive control (12); as well as
- other system parts, namely contact drums (8), support rollers (9), support scaffolding, as well as any other components that might be necessary.

Figure 1:
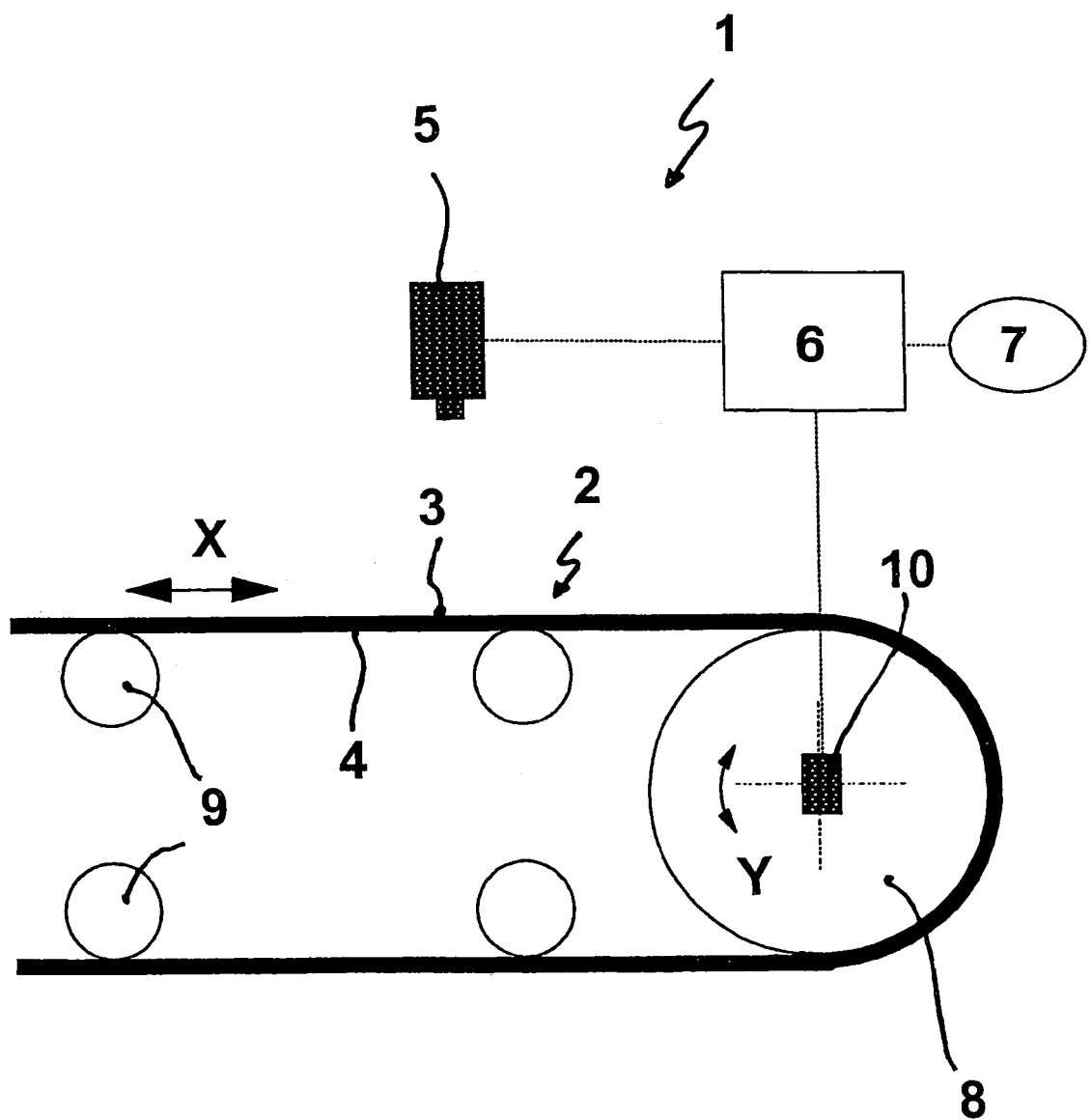

The device according to the invention is characterized in that the device is additionally equipped with at least one structure-borne noise sensor (10) that detects deviations from the reference frequency, whereby a process computer (6) that is connected with the structure-borne noise sensor evaluates the change in frequency, specifically with simultaneous balancing with the reports from the optoelectronic system (5), so that even in a case where the optoelectronic system itself does not report a critical state, an acoustical and/or optical alarm and/or in particular, an automatic shut-down of the conveyor is brought about, in that the process computer responsible for the structure-borne noise sensor is also connected with an alarm (11) and/or the drive control (12).

8 Claims, 2 Drawing Sheets

FOREIGN PATENT DOCUMENTS

| | | |
|---|---|---|
| DE | 44 44 264 | 4/1996 |
| DE | 195 32 010 | 3/1997 |
| DE | 100 29 545 | 2/2001 |
| DE | 101 00 813 | 8/2001 |
| DE | 101 29 091 | 5/2002 |
| DE | 101 40 920 | 5/2002 |
| EP | 1 053 447 | 11/2000 |
| EP | 1 187 781 | 3/2002 |
| EP | 1 222 126 | 7/2002 |
| JP | 05105222 A * 4/1993 | ............ 198/810.01 |
| WO | WO 2005/023688 | 3/2005 |

* cited by examiner

US 7,624,857 B2

DEVICE FOR MONITORING A CONVEYOR

CROSS REFERENCE TO RELATED APPLICATIONS

Applicant claims priority under 35 U.S.C. §119 of German Application No. 10 2005 029 637.8 filed Jun. 25, 2005. Applicant also claims priority under 35 U.S.C. §365 of PCT/DE2005/002094 filed on Nov. 23, 2005. The international application under PCT article 21(2) was not published in English.

The invention relates to a device for monitoring a conveyor, comprising:

- a conveyor belt made of elastomer material, having a carrying side for the goods to be conveyed, and a running side, whereby the conveyor belt has, in particular, an embedded strength support (e.g. steel ropes, woven fabric);
- an optoelectronic system that optically detects the carrying side and/or the running side, particularly the carrying side, in that it recognizes damage during operation, and if a critical state of the conveyor belt is reached, triggers an acoustical and/or optical alarm and/or brings about particularly automatic shut-down of the system;
- a process computer with which the optoelectronic system is coupled, for the purpose of evaluating all of the data, whereby the process computer is particularly connected with the alarm and/or a drive control; as well as
- other system parts, namely contact drums (drive drum, reversing drum, deflection drum), support rollers, support scaffolding, as well as any other components that might be necessary.

Since conveyor belts are often the most important part in mine systems, and their failure can frequently result in a complete shut-down of production, methods for automatic, continuous monitoring of the conveyor belts are required. Aside from the known methods of slit monitoring (DE 44 44 264 C2) and connection monitoring (EP 1 053 447 B1), methods for monitoring the entire belt surface are also in demand, in order to recognize wear damage or surface impact damage or its further development during operation, and to shut the belt down if a critical state is reached, in order to initiate repair measures in timely manner.

To achieve this goal, the use of optoelectronic systems, particularly in the form of electronic camera systems (line camera or surface camera), was proposed, and reference is made, in particular, to the following state of the art:

DE 100 29 545 A1

DE 101 00 813 A1

DE 101 29 091 A1

DE 101 40 920 A1

EP 1 187 781 B1

EP 1 222 126 B1

WO 2005/023688 A1

These optoelectronic systems generate images of the belt surface to be monitored, particularly of the carrying side, connected with automatic assessment and evaluation of the image information obtained in this manner. In order to be able to carry out effective automatic monitoring of the belt as a whole, localization of any desired point of the belt with millimeter accuracy is furthermore required, since only in this way is it possible to follow up the development of damage over a certain period of time, using automatic image processing software (WO 2005/023688 A1).

However, the optoelectronic monitoring systems and assessment unit used for the recognition of damage to a conveyor belt can have restrictions where damaged areas (e.g. notches, cracks, holes) are filled by conveyed material. This can particularly be the case for fine, sticky material that is not removed by simple strippers.

In order to compensate such possible gaps in the automatic monitoring, the new device is characterized, in accordance with the characterizing part of claim 1, in that the device is additionally equipped with at least one structure-borne noise sensor that detects deviations from the reference frequency, whereby a process computer that is connected with the structure-borne noise sensor evaluates the change in frequency, specifically with simultaneous balancing with the reports from the optoelectronic system, so that even in a case where the optoelectronic system itself does not report a critical state, an acoustical and/or optical alarm and/or in particular, an automatic shut-down of the conveyor is brought about, in that the process computer responsible for the structure-borne noise sensor is also connected with an alarm and/or the drive control.

Practical embodiments of the device according to the invention are indicated in claims 2 to 9.

Figure 2:
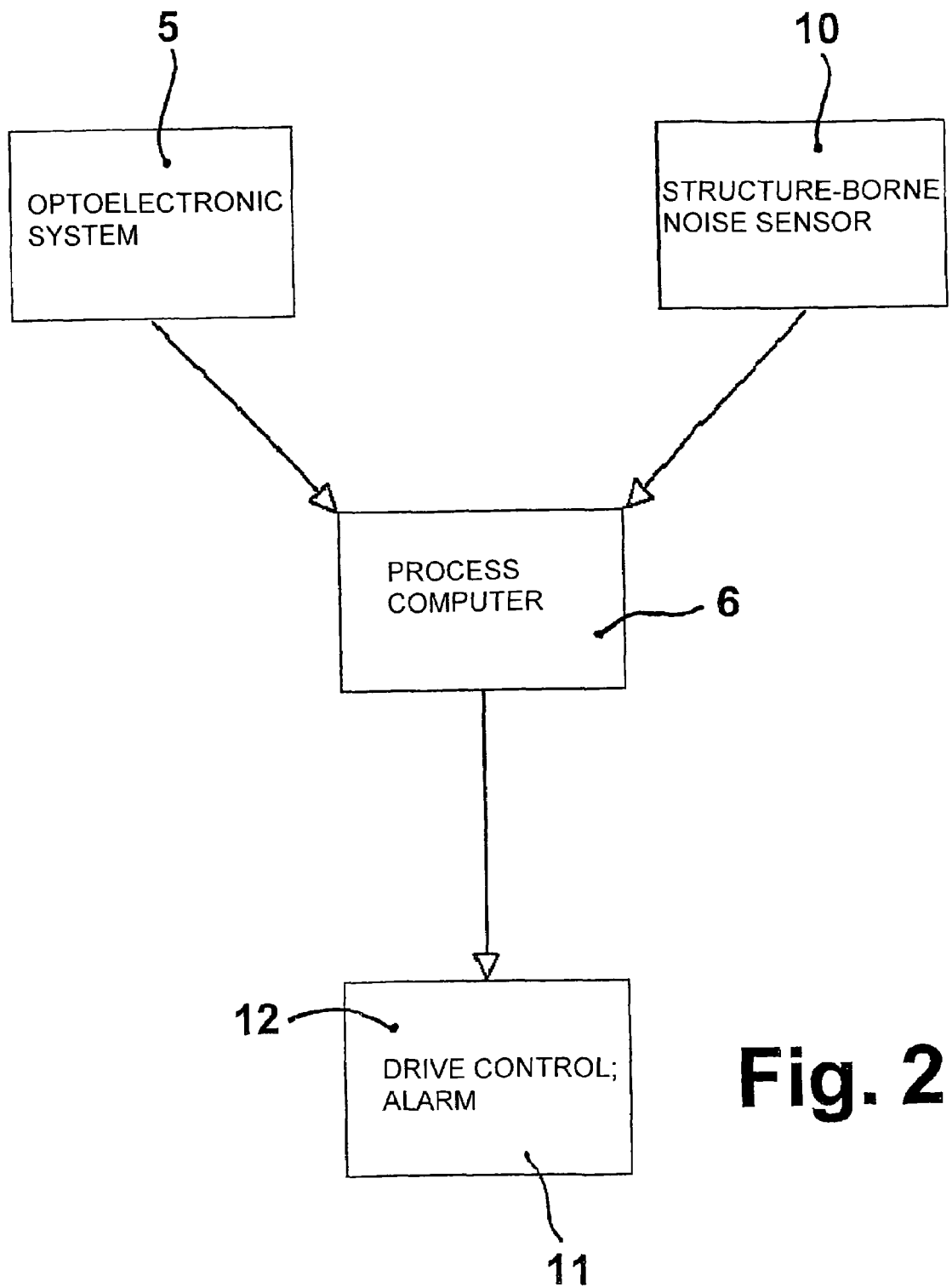

The invention will now be explained using an exemplary embodiment, making reference to schematic drawings. These show:

FIG. 1 a side view of a conveyor having structure-borne noise sensor, in the region of the reversing drum;

FIG. 2 the functional principle of optoelectronic system, structure-borne noise sensor, process computer, as well as alarm and drive control.

According to FIG. 1, the conveyor 1 comprises a conveyor belt 2 made of elastomer material, having a carrying side 3 and a running side 4. The optoelectronic system 5 optically detects the carrying side of the conveyor belt. A process computer 6, which is coupled with the optoelectronic system, evaluates the data, whereby the process computer is connected with an alarm 11 (FIG. 2) and a drive control 12 (FIG. 2).

A structure-borne noise sensor 10 is now disposed in a bore of the reversing drum 8, specifically within the center point of the drum.

The structure-borne noise sensor 10 is preferably installed in the vicinity of the optoelectronic system 5. The sensor does not contain any movable mass, so that there is no resonance that lies in the range of usual machine frequencies. The sensor preferably consists of several layers of piezoceramic. Piezoceramic converts pressure into electrical tension, which can be presented graphically, for example as frequency lines. The sensor signal 7 is proportional to the pressure forces that are in effect. The sensor usually works without a power supply and is practically wear-free. It is very small and can easily be built into the reversing drum 8 or another drum of the system. The vibration progression measured by the structure-borne noise sensor is passed on to a process computer 6. For practical purposes, this is the same process computer that is also used by the optoelectronic system 5 (FIG. 2). This also holds true for common use of the alarm 11 (FIG. 2).

After installation of the structure-borne noise sensor 10, the typical frequency range for the conveyor belt 3 is determined during a "learning run" and stored as the normal value.

During monitoring operation, deviations from the reference frequency, which indicate that damage to the conveyor belt 2 has occurred, are automatically balanced out with the reports from the optoelectronic system 5. If the optoelectronic system does not report any errors at this point, and if there is therefore a conflict between the two systems, an alarm or, in particular, an automatic shut-down are triggered. In this case, a closer examination of the location found is required.

According to the prior state of the art, a "stand-alone application" as a belt monitor has not been possible until now, because the frequency does not give any clear information about the quality of events. With this concept, however, it has become possible for characteristic frequencies for each type of damage and severity of damage to become recognizable, by means of refining of evaluation programs, which frequencies result in corresponding reactions, for example shut-down of the drive of the conveyor. Particularly with this aspect in mind, it can be practical to use several structure-borne noise sensors on the same component (e.g. reversing drum).

Another advantage of the structure-borne noise sensor is the possibility of localizing a damage location. The frequency lines can be assigned to specific events. For example, a connection present in each conveyor belt generates a different frequency profile than the actual belt. This point can be used as a zero point. The intervals are divided into small segments, by means of calculations, so that each damage location can be assigned to a specific longitudinal point in the conveyor belt.

Alternatively, a body that generates a noticeable frequency in the structure-borne noise sensor can be vulcanized into the conveyor belt.

For the remainder, the conveyors known until now, which comprise an optoelectronic system according to the state of the art cited initially, can be equipped with the structure-borne noise sensor without complicated additional measures. Thus, for example, the technology according to WO 2005/023688 A1 can be used with regard to damage localization with millimeter accuracy, in that the structure-borne noise sensor is integrated into the system designs disclosed in this reference.

REFERENCE SYMBOL LIST 1 conveyor
2 conveyor belt
3 carrying side
4 running side
5 optoelectronic system
6 process computer (process computer unit)
7 sensor signal
8 contact drum (reversing drum)
9 support rollers
10 structure-borne noise sensor
11 alarm (alarm unit)
12 drive control
X running direction of the conveyor belt
Y direction of rotation of the contact drum (reversing drum)

The invention claimed is:

1. A device for monitoring a conveyor, comprising:
a conveyor belt made of elastomer material, having a carrying side for the goods to be conveyed, and a running side, wherein the conveyor belt has an embedded strength support;
an optoelectronic system that optically detects at least one of the carrying side and the running side, said optoelectronic system recognizing damage during operation, and if a critical state of the conveyor belt is reached, triggering at least one alarm selected from the group consisting of an acoustical alarm and an optical alarm;
a process computer coupled with the optoelectronic system for evaluating all data, wherein the process computer is connected with at least one of the at least one alarm and a drive control; and
other system parts selected from the group consisting of contact drums, support rollers, and support scaffolding;
wherein the device is additionally equipped with at least one structure-borne noise sensor, anchored in a bore of at least one of the contact drum and the support rollers, with a non-positive lock, said at least one structure-borne noise sensor detecting deviations from a reference frequency, wherein the process computer is connected with the structure-borne noise sensor, evaluates a change in frequency using reports from the optoelectronic system, and triggers at least one of the at least one alarm and an automatic shut-down of the conveyor even when the optoelectronic system does not report a critical state.

2. The device according to claim 1, wherein the structure-borne noise sensor is disposed in a vicinity of the optoelectronic system.

3. The device according to claim 1, wherein the bore is disposed within a center point of at least one of the contact drum and the support rollers.

4. The device according claim 1, wherein the structure-borne noise sensor is anchored in a bore of at least one of a reversing drum and a deflection drum.

5. The device according to claim 1, wherein the process computer is a process computer unit.

6. The device according to claim 1, wherein the at least one alarm is an alarm unit.

7. A device for monitoring a conveyor, comprising:
a conveyor belt made of elastomer material, having a carrying side for the goods to be conveyed, and a running side, wherein the conveyor belt has an embedded strength support;
an optoelectronic system that optically detects at least one of the carrying side and the running side, said optoelectronic system recognizing damage during operation, and if a critical state of the conveyor belt is reached, triggering at least one alarm selected from the group consisting of an acoustical alarm and an optical alarm;
a process computer coupled with the optoelectronic system for evaluating all data, wherein the process computer is connected with at least one of the at least one alarm and a drive control; and
other system parts selected from the group consisting of contact drums, support rollers, and support scaffolding;
wherein the device is additionally equipped with at least one structure-borne noise sensor comprising piezoceramic and detecting deviations from a reference frequency, wherein the process computer is connected with the structure-borne noise sensor, evaluates a change in frequency using reports from the optoelectronic system, and triggers at least one of the at least one alarm and an automatic shut-down of the conveyor even when the optoelectronic system does not report a critical state.

8. A device for monitoring a conveyor, comprising:
a conveyor belt made of elastomer material, having a carrying side for the goods to be conveyed, and a running side, wherein the conveyor belt has an embedded strength support;
an optoelectronic system that optically detects at least one of the carrying side and the running side, said optoelectronic system recognizing damage during operation, and if a critical state of the conveyor belt is reached, triggering at least one alarm selected from the group consisting of an acoustical alarm and an optical alarm;

a process computer coupled with the optoelectronic system for evaluating all data, wherein the process computer is connected with at least one of the at least one alarm and a drive control; and other system parts selected from the group consisting of contact drums, support rollers, and support scaffolding;

wherein the device is additionally equipped with at least one structure-borne noise sensor configured in multiple layers and detecting deviations from a reference frequency, wherein the process computer is connected with the structure-borne noise sensor, evaluates a change in frequency using reports from the optoelectronic system, and triggers at least one of the at least one alarm and an automatic shut-down of the conveyor even when the optoelectronic system does not report a critical state.

* * * * *

UNITED STATES PATENT AND TRADEMARK OFFICE
CERTIFICATE OF CORRECTION

PATENT NO. : 7,624,857 B2 Page 1 of 1
APPLICATION NO. : 10/579585
DATED : December 1, 2009
INVENTOR(S) : Bernd Küsel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 868 days.

Signed and Sealed this

Twenty-sixth Day of October, 2010

David J. Kappos
*Director of the United States Patent and Trademark Office*